(No Model.)
E. A. C. PETERSEN.
BAKER'S OVEN.
No. 462,159. Patented Oct. 27, 1891.
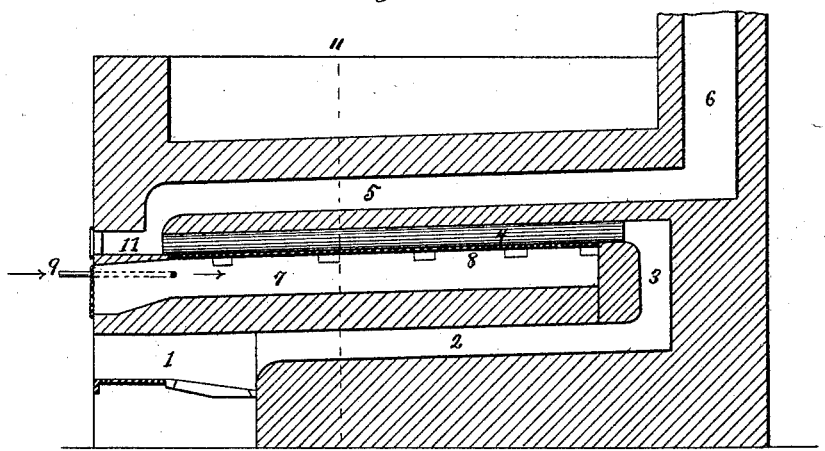
Fig. I.
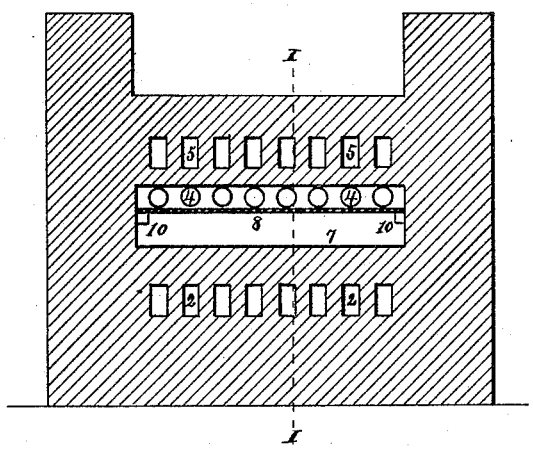
Fig. II.
Attest:
George E. Lerew
S. Cotton
Inventor:
Edw. A. C. Petersen
By Knight Bros
attys

UNITED STATES PATENT OFFICE.

EDWARD A. C. PETERSEN, OF CHICAGO, ILLINOIS.

BAKER'S OVEN.

SPECIFICATION forming part of Letters Patent No. 462,159, dated October 27, 1891.

Application filed April 4, 1891. Serial No. 387,665. (No model.)

*To all whom it may concern:*

Be it known that I, EDWARD A. C. PETERSEN, of the city of Chicago, in the county of Cook and State of Illinois, have invented a certain new and useful Improvement in Bakers' Ovens, of which the following is a full, clear, and exact description, reference being had to the accompanying drawings, forming part of this specification.

My present invention relates to an improvement upon Letters Patent of the United States No. 252,054, issued to me January 10, 1882. In the patent referred to the heat and products of combustion pass from the fire-box rearwardly beneath the baking-chamber, thence upwardly at the rear of the baking-chamber, and thence forwardly through tubes or pipes located in the baking-chamber at its crown or upper part, and thence through flues to the chimney or uptake.

The object of my present invention is to so arrange or construct this oven that it may be advantageously used for baking what is known as "Vienna" bread. In baking Vienna bread steam is introduced into the baking-chamber during the baking process, and the oven shown in my patent referred to is well adapted for this kind of baking for the reason that the pipes being located in the baking-chamber afford a means for rapidly heating the chamber while the products of combustion do not come in contact with the bread; but it is somewhat objectionable to have the steam come in contact with the hot circulating pipes or tubes, and it is also desirable to keep the steam as close to the bread as possible.

My present invention, broadly considered, consists in placing a metallic plate in the baking-chamber beneath the circulating pipes or tubes, as more fully described by reference to the drawings, in which—

Figure I represents a longitudinal section of my improved furnace, the section being taken on line I I, Fig. II, and Fig. II represents a transverse section taken on line II II, Fig. I.

Referring to the drawings, 1 represents the fire-box of the oven; 2, flues extending from the fire-box to the rear of the oven; 3, vertical flues at the rear of the oven; 4, the heating pipes or tubes located in the upper part of the baking-chamber 7 and forming a communication between the flues 3 and return-flues 5, through which the heat and products of combustion pass to the chimney or uptake 6. These parts may all be arranged as shown, described, and claimed in my patent referred to.

8 represents a shield or plate placed in the baking-chamber 7 immediately beneath the pipes or tubes 4.

9 represents a pipe through which steam is introduced into the baking-chamber and which is prevented from coming into contact with the pipes or tubes 4 by means of the plate 8, which also serves to keep the steam down close to the bread and from filling the spaces between the pipes, where it would accomplish no good. I prefer to make the plate 8 removable, so that the oven may be used, if desired, for baking ordinary bread. This may be accomplished by having the plate supported on inwardly-extending projections 10, so that it may be moved endwise, and by providing an opening in the front of the oven which may be closed by a removable wedge-shaped strip 11. (See Fig. I.) By taking out this strip 11 the plate may be removed when desired, and then by replacing the strip the oven is in perfect working condition, as shown in the patent mentioned.

I claim as my invention—

1. In a baker's oven provided with circulating-pipes located beneath the crown, a shield or plate 8, located beneath the circulating-pipes, substantially as and for the purpose set forth.

2. In a baker's oven provided with circulating-pipes in the baking-chamber at the crown, a removable shield or plate 8, substantially as and for the purpose set forth.

EDW. A. C. PETERSEN.

In presence of—
ALBERT M. EBERSOLE,
E. S. KNIGHT.